Oct. 28, 1952     M. G. HOLLOWAY     2,616,053
METHOD AND APPARATUS FOR MEASURING BEAM CURRENT
Filed Nov. 7, 1945     4 Sheets-Sheet 2

WITNESSES
Ralph Carlisle Smith
Herbert J. Miller

INVENTOR.
Marshall G. Holloway
BY
Robert A. Lavender

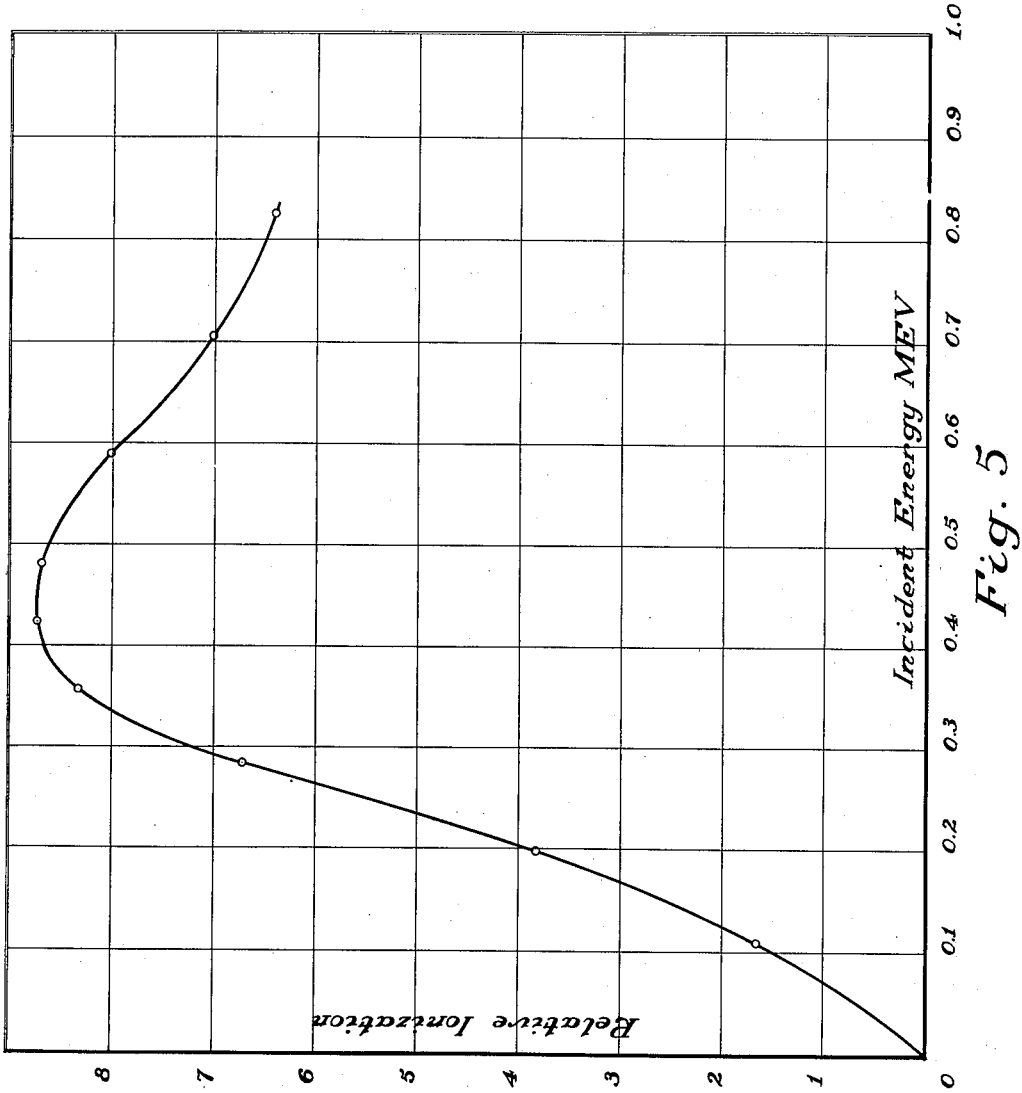

Patented Oct. 28, 1952

2,616,053

UNITED STATES PATENT OFFICE 2,616,053

METHOD AND APPARATUS FOR MEASURING BEAM CURRENT

Marshall G. Holloway, Ithaca, N. Y., assignor to the United States of America as represented by the United States Atomic Energy Commission Application November 7, 1945, Serial No. 627,268

3 Claims. (Cl. 250—83.6)

This invention relates to an improved method and means for making nuclear measurements, and more particularly to a method and apparatus for measuring the various phenomena, capable of electronic detection, produced by the accelerated charged particle beam in a cyclotron.

In the disintegration or transmutation of various elements by bombardment by high speed charged particles, the determination, for example, of the cross-section of the reaction (i. e. probability that the reaction will occur) is an important consideration. In other words, it is important in the investigation of nuclear reactions, to determine how many transmuted atoms will result from a given type of bombardment for a predetermined period of time. The determination of such cross-section from observed experimental data requires, inter alia, the measurement of the number of incident bombarding charged particles, and the energy distribution of them.

Many methods have been described for determining the energy and intensity of the incident beam in a cyclotron and other accelerating devices. Pulse amplifiers of varied sensitivity have been employed in the art which are arranged together with counting circuits to permit more or less accuracy in such measurements. Similarly the radioactivity induced in a substance has been determined and the number of bombarding particles necessary to produce such radioactivity can be estimated. However, all of the methods previously used in the art have employed only approximate calibration techniques in order to determine the energy and the intensity of an accelerated beam of charged particles. This was particularly true where, because of the requirements of many transmutation operations, the current value of the beam of bombarding particles was too large to be counted by a pulse amplifier and counting circuit alone, and yet too small to be measured by other more conventional methods such as, for example, milliammeters and/or the like.

It will be seen, then, that this invention has as an object, to provide a method for rapidly determining the energy of the particles of an accelerated charged particle beam.

It is another object of this invention to provide means for precisely determining the number of charged particles in an accelerated beam of such particles.

It is a further object to provide a simple compact means for the measurement of beam currents and energies in an apparatus for the acceleration of charged particles such as a cyclotron.

Other objects will be apparent to one skilled in the art from the following detailed description and illustrative examples:

In accordance with the objects stated and in furtherance of them, the present invention provides a U-shaped or continuous loop electrode disposed in the target region of a charged particle accelerating device and in a position to detect the ionization caused by the highly accelerated charged particles in the incident bombarding beam, and alternatively to detect the particle energy by being responsive to the amount of ionization caused by said accelerated charged particles; and calibrated electronic circuit means alternately connected to the electrode to permit discrimination between the ionization current caused by charged particle bombardment of a gas in the target zone and the pulses caused by said ionization bursts detected by said electrode.

In order to illustrate the advantages of the present invention and to explain the attainment of the objects above stated, reference is made to an embodiment used in connection with a cyclotron type of charged particle accelerating device although it will be apparent that with only minor changes and variations, the invention can be adapted to many other types of accelerating apparatus. Such an embodiment and various experimental data curves are shown in the attached drawings which are made a part of this specification in which:

Figure 4 is a chart showing typical energy distribution curves as obtained by the use of the continuous loop probe electrode with a pulse amplifier and Figure 5 is a chart of the typical relative ionization caused by a charged particle beam at various incident energies.

Figure 1:
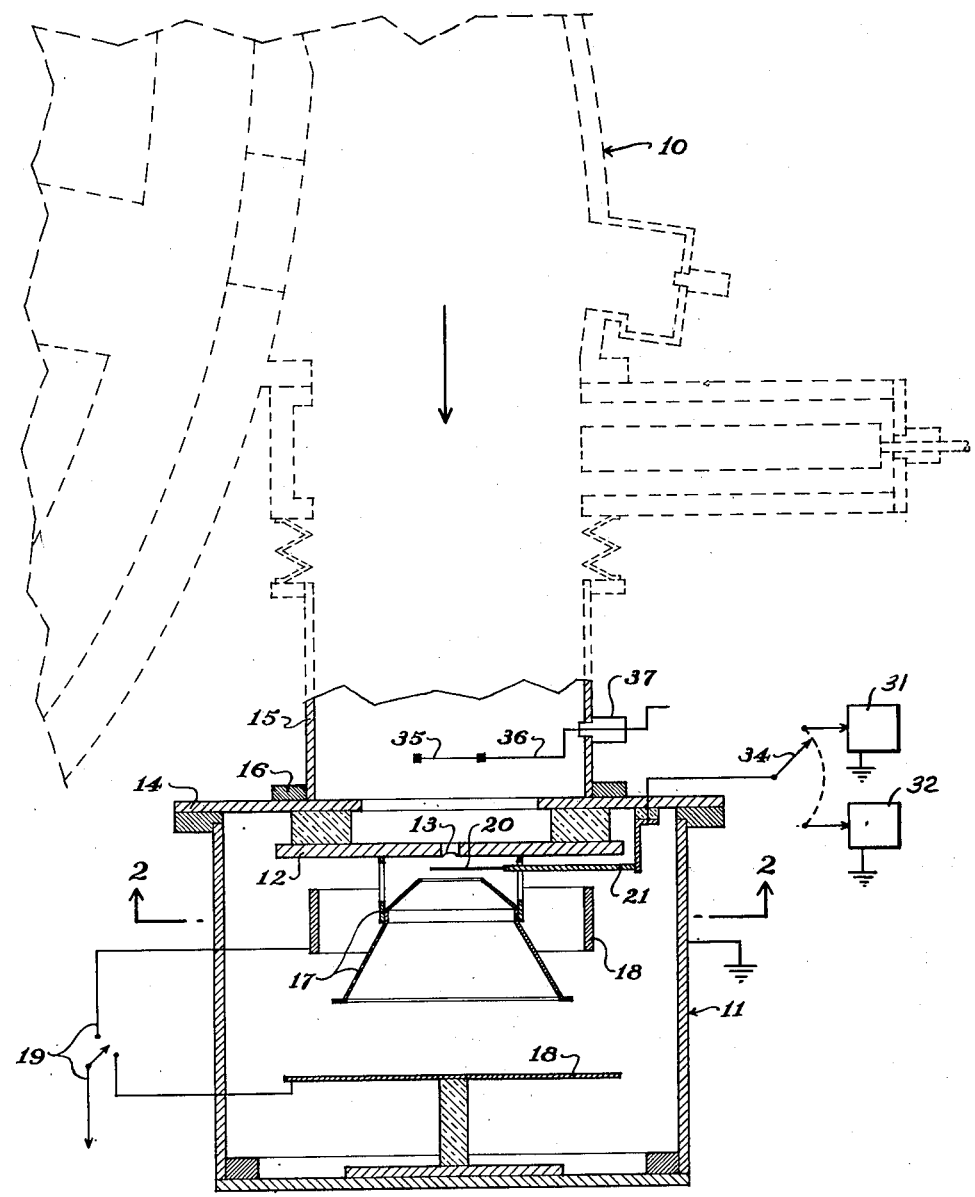
Figure 1 is a schematic view in plan of a portion of a cyclotron structure indicating the location of the various elements with respect to the accelerated charged particle beam.

Referring to the drawings and more particularly, Figure 1, a cyclotron structure indicated at 10, having accelerating electrodes, gate valves, sealed flexible mountings and like accessories, and in which the beam direction is indicated by the arrow, is provided with a sealed air-tight disintegration chamber 11, cylindrical in form which surrounds and extends outwardly of the exit port or exit aperture plate 12 of the cyclotron.

The subatmospheric state of the cyclotron is maintained by a thin aluminum sealing exit foil 13, which permits the penetration of charged particles therethrough, soldered or otherwise attached in air-sealing relationship over the exit aperture in the port plate 12. Support for the disintegration chamber 11, is provided by the annular flange member 14, which is made integral with the exit tube 15, of the cyclotron by a sealed joint such as is attained by brazing or soldering and includes the reinforcing ring 16.

Various collimating elements 17, and collecting plates 18, for disintegration particles, are provided in the disintegration chamber, but, because they do not form part of the present invention, their construction will not be given in detail. The function of these elements is to permit the determination of various factors in a typical cross-section investigation such as will be discussed later, and more particularly from the standpoint of the present invention they serve to define the target zone in which disintegration and/or transmutation are effected. The collecting plates are connected to a suitable pulse amplifying and recording circuit, many types of which are well known in the art, and are indicated schematically at 19.

Figure 2:
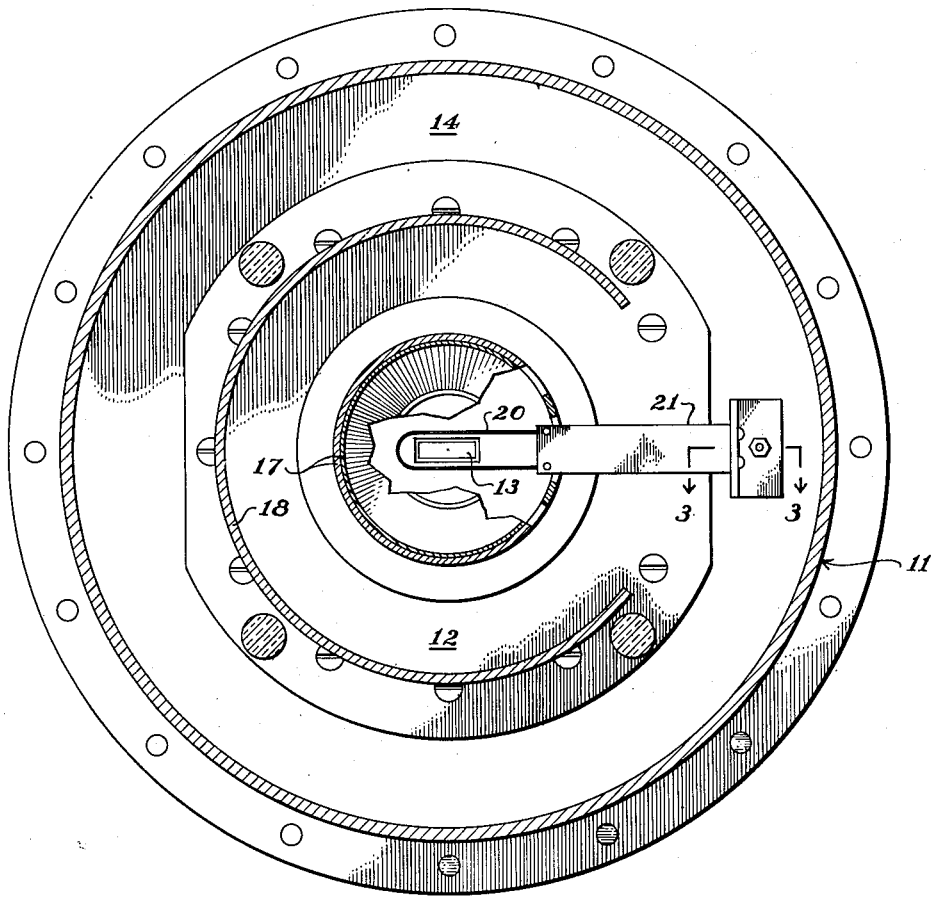
Figure 2 is an elevational view taken on the line 2—2 in Figure 1, partly in section and partly cut away, showing the location of the probe electrode and details of its construction.

The probe electrode 20, which is one of the features of the present invention, is positioned within the disintegration chamber 11, in spaced relationship with the exit foil 13, thus being positioned between the exit aperture and the target zone defined by the collecting plates 18, and the collimating elements 17. The electrode comprises a 10 mil copper wire bent to a U shape and having its respective ends inserted into respective accommodating recesses in the copper stand-off supporting member 21 (Figure 2) and rigidly fixed therein by soldering or the like so as to form a continuous elongated loop. As shown in Figure 2, the width of the loop is slightly greater than the width of the exit aperture in the port 12. Furthermore, the length of the loop electrode is determined and the electrode positioned so as not to obstruct the beam and prevent the desired bombardment of the target element in the target zone.

Figure 3:
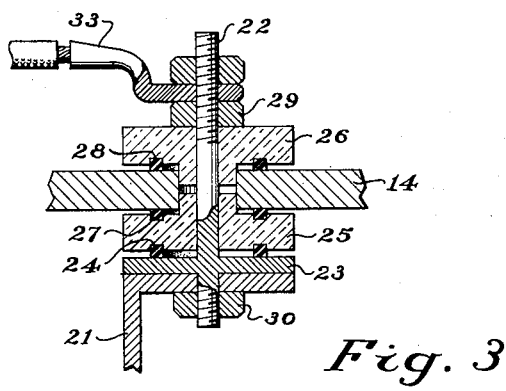
Figure 3 shows further details of the insulating, air-tight support for the probe electrode.

The support member 21 is rigidly mounted on the flange 14 and insulated therefrom by means of the arrangement shown in Figure 3, though any equivalent structure would be satisfactory if means for permitting an insulated air-sealing structure are provided. Referring to Figure 3, it will be noted that the copper mounting stud 22 is threaded at both ends and is provided with an integral large diameter portion 23, which is adapted to press against a continuous annular gasket 24 maintained in collar 25. The electrically insulated relationship between the support 21, together with the stud 22, and the member 14, is provided by the insulating bushings 25 and 26 adapted to accommodate the stud 22 and to position it in the aperture in the member 14. The bushings 25 and 26 may be of Lucite or similar insulating materials which may be readily machined to facilitate manufacture. In this embodiment, annular recesses are machined in both faces of collar 25 to accommodate gaskets 24 and 27 so that upon assembly of the mounting the sealed state of the chamber 11 can be maintained. Bushing 26 has only a single annular recess machined therein to accommodate gasket 28. To assemble the insulating mounting, the gaskets 27 and 28 are placed in the recesses provided in insulating bushings 25 and 26 respectively. The bushings are positioned in the accommodating aperture drilled in member 14 and stud 22 is passed through the central bores in each of the bushings so that the flanged portion 23 presses against gasket 23. Nut 29, when drawn up on the threaded end of the stud extending outwardly of the chamber, draws the component parts into air-sealed assembly. The electrode support 21 is then mounted on the end of the stud, which extends inwardly of the disintegration chamber and is fixed in position by tightening nut 30.

It will thus be seen that the stud 22 acts as a feed-through conductor of the pulses and/or ionization currents detected by the probe electrode 20, during operation, and passes in an insulated and air-sealed manner through the walls of said chamber to permit such pulses and/or ionization currents to be amplified and recorded through the use of suitable electronic circuits indicated at 31 and 32 (Figure 1). The lug 33, held in conducting relationship with stud 22, by suitable means such as a nut or the like, indicates the continuity of the circuit from the feed-through conductor through the manually operated selector switch 34, to the alternate electronic circuits 31 and 32, discussed hereinafter.

Circuit 31, hereinafter referred to as the pliotron circuit as it utilizes an electronic tube known in the art as a pliotron or direct current amplifying tube, is of standard type and will not be discussed in detail. Any circuit which is responsive to extremely small currents and is capable of amplifying those currents to give readings on standard meters or to actuate suitable standard recording device, may be employed. In the particular disintegration operation described by way of illustration hereinafter, it was found that a balanced type of circuit using a Western Electric 96457 vacuum tube was satisfactory. Such a circuit is shown, for example, in the Review of Scientific Instruments, volume 6, page 115 et seq. 1935.

The ionization current detected by the electrode 20 produces a voltage drop across a fixed value precision resistor selectively inserted in the circuit by a suitable selector switch (not shown) and predetermined to permit the greatest degree of stability possible. This voltage drop is measured by the pliotron.

Circuit 32 includes a linear pulse amplifier of conventional design. The output of the amplifier is split into two channels which are made as nearly alike as possible. Each of the channels has a scale of thirty-two connected to the output of a biased thyratron. It is thus possible to bias the output of one thyratron to respond to small pulses and to monitor operation of the other channel with a variable bias to obtain the pulse height distribution.

It should be noted here that the exit aperture in the exit port plate 12, in the particular embodiment discussed here, is about one-eighth inch by one-half inch in its rectangular dimensions. The distance between the extended straight portions of the loop electrode 20 is about three-eighths of an inch to minimize interference with the operation of the collecting elements 18 and with bombardment in the target zone and yet is positioned close enough to the boundaries of the incident charged particle beam to detect the ionization caused thereby as well as to be responsive to pulses therefrom. The electrode 20 is spaced about one-eighth of an inch from the port plate 12, although this dimension may be varied depending on the particular application.

A screen 35, is movably supported in the exit tube 15, in advance of the exit port plate 12 (see Figure 1). This screen may be of very fine meshed wire construction or any other type found suitable and is capable of reducing the beam intensity by a known amount, as for example, by a factor of ten, in order to facilitate calibration of the pliotron as will be explained later. The screen is mounted on a rotatable support indicated at 36 in Figure 1, and extends through any well-known vacuum seal 37, such as a Wilson seal for example, to the outside of the exit tube 15, of the cyclotron. The support structure 36, is arranged so that rotation thereof causes the screen, 35, to be removed from the path of the accelerated charged particle beam.

Now, a typical operation of the illustrative embodiment described above occurs in the determination of the cross-section at various incident energies for the reaction resulting from the bombardment of deuterium with ionized particles of the helium isotope of mass three which may be written in the form $$D^2 + He^3 \rightarrow He^4 + P$$

A source of ionized helium particles is provided at the center of the cyclotron 10, and acceleration of these charged particles is accomplished in the standard manner now well-known in the art. The deuterium target in gaseous form, is introduced into the disintegration chamber 11. The problem then, in the determination of the cross-section is to determine the number of target atoms (i. e. deuterium atoms) and the yield in helium 4 or alpha particles.

The determination then, involves the evaluation of the relationship $$\bar{\sigma}_a = \frac{Y}{N_t \bar{\omega}}$$

in which $\bar{\sigma}_a$ is the absolute cross section at any particular energy averaged for the thick target used and the energy distribution of the incident beam; $N_t$ is the number of effective target atoms per square centimeter of cross section of the beam and $\bar{\omega}$ is the average solid angle in the center of mass system in which disintegration alpha particles are observed. Y is the yield, that is, the number of alpha particles, divided by the number of incident deuterium particles, and is obtained by first calibrating the pliotron circuit in the following manner. The screen 35 is interposed in the cyclotron charged particle beam, thereby reducing the intensity thereof to a point where the resolution time of the linear pulse amplifier circuit 32 permits accurate counting and a count of the number of incident particles per unit time (designated as $n$) in the target zone is made with manual selector switch 34 moved to the appropriate position to connect probe electrode 20 to pulse amplifier circuit 32. Without altering the beam intensity, switch 34 is then moved to connect probe electrode 20 to the pliotron circuit 31 and a current reading proportional to the ionization current caused by the incident particles is taken from the meter provided in the plate circuit of the pliotron, but not shown. This current reading which is proportional to the voltage drop across input resistor of value $R_1$ is designated as $i$. A relationship is thus arrived at between the number of incident particles per unit time, and the meter reading (i. e., the ionization produced in the target zone by the incident particles).

When screen 35 is removed by rotating support 36, the undiminished beam enters the target zone. Though the counting rate necessary to permit an accurate count to be made is higher than obtainable with present equipment, the number of incident particles may still be determined from the meter reading (designated by I), which is proportional to the ionization caused by the undiminished beam. This current reading is proportional to the voltage drop across an input resistor $R_2$ in the pliotron circuit. It is apparent then, that if the resistor ratio $R_2/R_1$ is designated by R that the number of incident particles per unit time in the undiminished beam (N) may be arrived at from the proportion $$\frac{N}{n} = \frac{I}{iR}$$

By defining a pliotron calibration number P as the ratio of the number of incident particles per unit time to the meter reading they produce, P is then equal to $$\frac{N}{I} \text{ or } \frac{n}{iR}$$

The yield Y, is then determined by counting the disintegrations per second (D) as alpha particles detected by the pulse amplifier circuit 19 through electrodes 18, and evaluating the relationship:

$$Y = \frac{D}{N} = \frac{DiR}{In}$$

Inasmuch as the number of target atoms $N_t$ is readily determined from the temperature and pressure of the gas at the time of filling and the dimensions of the target chamber, it is clear that the novel methods here described largely simplify cross section determinations.

Figure 4:
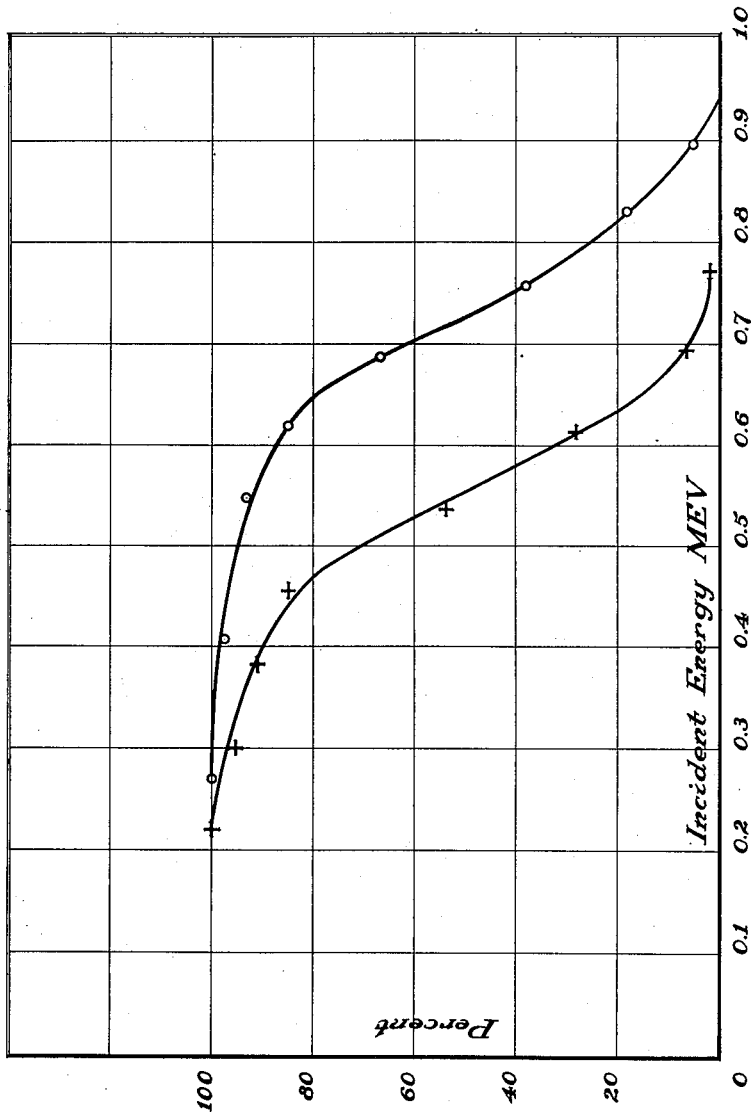

Due to the fact that the cross section of the reaction varies with the incident energy, a determination of this factor is necessary which emphasizes further utility of the system disclosed herein. The pulse amplifier circuit includes suitable standard electronic devices or the like such as a recording oscilloscope or oscillograph for indicating and/or recording the pulse heights detected by electrode 20. It is thus possible to compare the pulse heights from known-energy range particles, such as from alpha particles emitted by polonium to obtain the energy distribution of the incident particles. Figure 4 shows two such distribution curves prepared from data obtained according to the above method.

The calibration of the pliotron may be extended from the base energy at which the value of the equation $$P = \frac{n}{iR_1}$$

is determined, by the preparation of a relative ionization curve such as is shown in Figure 5. This curve is obtained by varying the incident energy through the use of a series of suitable foils not shown in the drawings. A satisfactory type would be one described in the copending U. S. patent application of Charles Baker, S. N. 610,644, filed August 13, 1945, now Patent No. 2,485,470. At a particular incident energy as determined by the pulse heights recorded by the pulse amplifier circuit, the ionization current is indicated by the pliotron. Now, the pliotron calibration, as has been noted, is defined as the ratio of the number of particles to the ionization current observed, and therefore the pliotron calibration is inversely proportional to the relative ionization current as given by the relative ionization curve (Figure 5). Hence, $$\frac{P}{P_0}=\frac{I_0}{I} \text{ or } P=\frac{P_0 I_0}{I}$$

Where $P_0$ and $I_0$ are the direct pliotron calibration and the maximum relative ionization respectively and $P$ and $I$ are the corresponding quantities at any other energy.

While a preferred embodiment of the invention has been given and a particular disintegration operation indicating the general usefulness of a probe electrode positioned outwardly of the exit foil and in advance of the target zone of a cyclotron type of charged accelerating device, has been described by way of illustration, it is obvious that many variations in use, structure and the methods described, are possible. The shape of the electrode and the position with respect to the beam are governed by factors which vary depending on the disintegration or transmutation operations being undertaken. Similarly, the particular electronic indicating and/or recording devices employed in connection with the electrode and the activating circuits thereof may also be of types which record or indicate other phenomena than are described above. It is therefore apparent that many changes in materials, structure and/or operation may be made without departing from the spirit and scope of the invention as defined in the appended claims.

It is claimed:

1. The combination with a charged particle accelerating device having an exit aperture to permit the emergence of the charged particle beam therefrom, and a target zone, of a continuous loop electrode, means supporting said electrode between said exit aperture and said target zone and in a position to permit the emergent charged particle beam to pass through the zone defined by said loop, and electronic indicating means electrically connected to said electrode and to an equipotential point on said accelerating device whereby it is responsive to the phenomena detected thereby.

2. The combination with an enclosed charged particle accelerating device having an accelerating zone, an exit aperture to permit the emergence of the charged particle beam therefrom, and a target zone, of a continuous loop electrode, means supporting said electrode between said exit aperture and said target zone and in position to permit the emergent charged particle beam to pass through the zone defined by said loop, electronic indicating means including a direct current amplifier responsive to the ionization caused by said emergent beam and detected by said electrode, conducting means electrically connecting said electrode, and conducting means electrically connecting an equipotential point of said accelerating device to the input of said electronic means.

3. The combination with an enclosed charged particle accelerating device having an accelerating zone, an exit aperture to permit the emergence of the charged particle beam therefrom, and a target zone, of a continuous loop electrode, means supporting said electrode between said exit aperture and said target zone and in position to permit the emergent charged particle beam to pass through the zone defined by said loop, electronic indicating means including a linear pulse amplifier circuit responsive to the pulse heights of the emergent charged particle beam and the number of said particles as detected by said electrode, and a plurality of conducting means electrically coupling said electrode and an equipotential point of said particle accelerating device with said electronic means.

MARSHALL G. HOLLOWAY.

REFERENCES CITED

The following references are of record in the file of this patent:

UNITED STATES PATENTS

| Number | Name | Date |
|---|---|---|
| 1,948,384 | Lawrence | Feb. 20, 1934 |
| 2,097,860 | Failla | Nov. 2, 1937 |

FOREIGN PATENTS

| Number | Country | Date |
|---|---|---|
| 252,207 | Great Britain | Aug. 4, 1927 |